United States Patent [19]

Bensa et al.

[11] 3,992,350

[45] Nov. 16, 1976

[54] PROCESS OF MIXING FILLERS WITH POLYTETRAFLUORETHYLENE AND TETRAFLUORETHYLENE COPOLYMERS

[75] Inventors: Rene Bensa, Tassin-La-Demi-Lune; Andre Monnet, Lyon; Gabriel Vincent, Oullins, all of France

[73] Assignee: Produits Chimiques Ugine Kuhlmann, Saint-Denis, France

[22] Filed: Nov. 14, 1974

[21] Appl. No.: 523,754

Related U.S. Application Data

[63] Continuation of Ser. No. 355,468, April 30, 1973, abandoned.

[30] Foreign Application Priority Data

May 4, 1972  France .............................. 72.15808

[52] U.S. Cl. ............................ 260/33.6 F; 241/18; 241/22; 241/65; 260/42.27
[51] Int. Cl.² ...................... C08K 3/04; C08K 3/10; C08K 3/40; C08K 5/01
[58] Field of Search ....... 260/33.6 F, 42.27, 87.5 A, 260/87.5 B, 92.1; 241/18, 22, 65

[56] References Cited

UNITED STATES PATENTS

| | | | |
|---|---|---|---|
| 2,347,464 | 4/1944 | Cuno | 241/22 |
| 2,593,582 | 4/1952 | Lontz | 260/33.6 F |
| 2,971,908 | 2/1961 | Chaffin | 252/12 |
| 3,409,584 | 5/1968 | Buschman et al. | 260/42.27 |
| 3,597,405 | 8/1971 | Kometani et al. | 260/92.1 |
| 3,633,830 | 1/1972 | Oberpriller | 241/18 |

*Primary Examiner*—Donald E. Czaja
*Assistant Examiner*—H. H. Fletcher
*Attorney, Agent, or Firm*—Pennie & Edmonds

[57] ABSTRACT

This invention relates to filled or charged tetrafluorethylene polymers and copolymers useful as molding or extrusion materials and to their use for the production of various products by lubrication extrusion. The filler and polymer or copolymer are mixed by grinding them together at a temperature of about −80° to about +15°C.

3 Claims, No Drawings

PROCESS OF MIXING FILLERS WITH POLYTETRAFLUORETHYLENE AND TETRAFLUORETHYLENE COPOLYMERS

This is a continuation of application Ser. No. 355,468, filed Apr. 30, 1973, now abandoned. DISCUSSION OF PRIOR ART U.S. Pat. No. 2,593,582 discloses a process for making and using tetrafluorethylene polymers and copolymers (hereinafter referred to collectively as PTFE ) for the purpose of manufacturing various shaped objects such as rods, tubes, sheets, and so forth by means of the lubrication extrusion process or technique. This lubrication extrusion process is well known to those skilled in the art and the lubricant generally used is a saturated aliphatic or cycloaliphatic hydrocarbon which is thoroughly mixed with the PTFE powders under specified conditions which are also well known in the art.

This method has been extended to the treatment by lubricated extrusion of mixtures of PTFE and mineral charges or fillers for the purpose of achieving on the one hand, a reduction in the price of the manufactured articles and, on the other, for obtaining products which are endowed with improved wear and compression resistant properties. For example, according to French Pat. No. 1,559,183 such mixtures of PTFE and charges or fillers can be obtained by adding the filler, which has been previously impregnated with PTFE by means of a wet phase treatment, to an aqueous dispersion of PTFE and then coagulating the whole either by agitation or by adding coagulating agents such as organic solvents, mineral salts, organic salts, etc.

French Pat. No. 1,601,622 describes a method for preparing filled PTFE which consists in using fillers covered with a fine coating of organic, oligomer or polymeric compounds of Group IV elements in the periodic table.

These processes for preparing filled PTFE from PTFE dispersions require the use of high quality mixing and coagulating installations designed to prevent, in particular, any risk of contamination or pollution of the virgin PTFE, or the filler particles. Furthermore, various difficulties are inherent in any coagulation of PTFE, since the required product is a precipitate of a specific granular size which is dependent upon the particular coagulation conditions employed. The presence of mineral fillers such as metallic powders or fiberglass, which separate almost spontaneously from the mixture, also interferes with the coagulation process even though the coagulation takes place very rapidly.

The PTFE compounds prepared by the dry method, as discussed above, are unusable in lubricated extrusion processes. In fact, these PTFE powders lose their plasticity because of the mechanical mixing and homogenizing treatments to which they must be subjected and thereby lose their extrusion capabilities.

SUMMARY OF THE INVENTION

This invention relates to new, mineral filled or charged, PTFE materials or powders prepared by crushing or grinding PTFE-mineral mixtures at a temperature ranging from about −80° C to −25° C to produce PTFE powders which can readily be formed into various shapes by the lubrication extrusion process and which have excellent and desirable physical properties.

The applicants have unexpectedly found that if the crushing of the PTFE-mineral mixtures is carried out under the above conditions, the prior art problems discussed above become practically nonexistent and that it is thus possible to obtain in a simple and quick manner, PTFE compounds charged or filled with any mineral fillers. The process of this invention also permits the use of fillers alone or in admixture, fillers of high or low density and fillers in various forms, such as powders or fibers.

DETAILED DESCRIPTION OF THE INVENTION

The crushing of the PTFE mineral filled mixtures can be carried out by using well known and available equipment, such as a blade-type crusher.

The temperature of the crushing or grinding operation can begin within the range of about −80° C to −25° C. During the crushing or grinding operation the temperature of the PTFE powders necessarily rises and the extent to which this temperature rises will depend upon insulation of the equipment as well as upon the particular method and equipment used to effectuate the crushing or grinding. In order to accomplish the objects of this invention, the final temperature of the PTFE-mineral mixture at the end of the grinding operation should not exceed about +15 ° C.

The length of the crushing operation generally ranges from about 20 to about 30 seconds or from about 1 to about 3 minutes depending upon the equipment used and the energy imparted to the equipment. The only requirement for the preparation of the PTFE-mineral mixtures according to this invention is that the temperature does not exceed about +15° C at the end of the crushing operation. In order to accomplish this objective, the crushing operation is begun within a temperature range from about −80° C to −25° C and the particular starting temperature will of course depend upon the equipment being employed and the energy imparted to this equipment as will be apparent to those skilled in the art of material handling. The required temperature reduction can be accomplished by means of well known equipment and processes, for example, by precooling the PTFE filled powders in a refrigerated container, by using a cryogenic crusher, or by introducing a low temperature fluid, such as liquid air or liquid nitrogen, into the mixture at the time of crushing via known and conventional means.

As previously stated the applicants know of no fillers regardless of form or density that cannot be used according to this invention. Some examples of mineral fillers that can be used in accordance with this invention include fiberglass, ground glass, graphite in various forms, nickel, bronze, coke and various ceramic materials. Mixtures of various mineral fillers can also be used such as mixtures of fiberglass and molybdenum bisulfide and fiberglass and graphite.

The amount or percentage of mineral fillers that can be incorporated into the PTFE will vary depending upon the particular filler being used and the end properties desired in the finished product. It has been found, for example, that up to about 25 percent by weight graphite or up to about 60 percent by weight bronze powder can be used according to this invention. The exact amount of filler or mixed fillers that can be used can readily be determined by one skilled in the art by routine experimentation to obtain the properties desired in the finished extruded or molded products.

The fact that the filled PTFE compositions are prepared by a dry method eliminates all of the problems relating to compatibility of the fillers with PTFE emulsions. The method of this invention therefore permits the preparation of mixtures or fillers with PTFE as well as filled copolymers of tetrafluorethylene. The various copolymers of tetrafluorethylene that can be used according to this invention are well known. Such copolymers can be prepared by copolymerizing tetrafluorethylene and any other monomer which is capable of being polymerized therewith, such as ethylene, hexafluoropropylene, etc. Copolymers containing at least 50 percent by weight of the tetrafluoroethylene in the copolymer can be advantageously used.

The particular PTFE powders that can be filled according to this invention is not critical, but PTFE powders prepared by the emulsion technique are advantageously employed.

Although the PTFE-filled compositions according to this invention are particularly advantageous for use in the lubrication extrusion processes, they can also be advantageously used for any purpose that PTFE powders or PTFE-filled powders have previously been used, such as in conventional molding processes.

The following examples serve to illustrate the invention and are not to be construed in any way to limit the scope of the invention. The percentages given in the following examples are by weight.

EXAMPLE 1

Preparation of PTFE homopolymer with a 50 percent nickel charge.

1,000 grams of fine PTFE homopolymer powder having a granular size range from about 300 to 600 microns, marketed by Produits Chimiques Ugine Kuhlmann under the registered trademark SOREFLON 6, and 1,000 grams of nickel powder having a granular size ranging from about 3 to 10 microns are mixed and placed in a cold chamber at a temperature of −30° C for a period of 24 hours. The mixed powders are then introduced into a four-blade grinder or crusher rotating at a speed of 3,000 revolutions per minute and ground for a period of about one minute. The temperature attained at the end of the grinding or crushing operation is +10° C. The mixture which is obtained is supple and has a high degree of fusibility. It flows freely through a 1.7-mm screen.

400 g. of mineral spirits boiling at a temperature between 100° and 128° C and with a 35 Kauri Butanol index are added to this mixture. The resulting mixture is then agitated for a period of 15 minutes and, after standing for 4 hours at a temperature of 23° C, is preformed in a 60-millimeter-diameter pot at a pressure of not more than about 30kg/cm². The preform is then processed in a standard-type extruding press, without dieplate heating to form rods, or other shapes. The extruded shaped forms are then baked at a temperature ranging from 370° to 380° C for a period of 3 to 4 minutes. Observation of the baked forms showed that they have a good surface appearance and other excellent characteristics as illustrated in Table 1 below.

TABLE 1

| Die-Plate Diameter mm | Mandrel Diameter mm | Extruding Pressure kg/cm² | Surface Appearance of the Extruded Material | Breaking Load kg/cm² |
|---|---|---|---|---|
| 22 | 8 | 95 | Very smooth | 170 |
| 12 | 8 | 295 | Very smooth | 260 |
| 10 | 6 | 350 | Smooth | 250 |
| 4 | — | 300 | Smooth | 160 |

EXAMPLE 2

Preparation of a PTFE homopolymer with 15 percent glass and 5 percent graphite.

187.5 grams of ground glass, 62.5 grams of graphite powder which passes completely through a 300-mesh screen, i.e., 0.048-mm meshwork spacing, and 1,000 grams of PTFE homopolymer are placed in a grinder or crusher of the type indicated in Example 1 and the temperature of the mixture is reduced to −40° C by adding 200 centimeters of liquid nitrogen. The total mixture is then crushed or ground for one minute, and at the end of the crushing operation the temperature attained is in the vicinity of 0° C. The resultant mixture is supple and has a high degree of fusibility. It completely flows through a 1.7-mm screen.

310 g. of the Shell Company's Dilutine 21 White Spirit, with a boiling range of 143° C to 175° C is added to the ground mixture and agitated for 20 minutes and then allowed to set for 4 hours at a temperature of 23° C. The mixture is then preformed at a pressure of 30kg/cm², extruded and roasted in a continuous vertical furnace which has been heated to 380° C. The extruded materials obtained have a very good surface appearance, and the following characteristics:

| Die-Plate Diameter mm | Mandrel Diameter mm | Extruding Pressure kg/cm² | Surface Appearance of the Extruded Material | Breaking Load kg/cm² |
|---|---|---|---|---|
| 20 | 9 | 40 | Very smooth | 200 |
| 12 | 8 | 150 | Smooth | 290 |
| 10 | 6 | 190 | Smooth | 330 |
| 4 | — | 330 | Smooth | 190 |

We claim:
1. The method of preparing filled polytetrafluoroethylene or tetrafluoroethylene copolymers which comprises (a) mixing polytetrafluoroethylene or a tetrafluoroethylene copolymer containing at least 50 per cent by weight of tetrafluoroethylene in the copolymer, with a mineral filler, and (b) crushing or grinding the mixture under conditions such that (i) the temperature of the mixture at the beginning of the crushing or grinding is in the range of from about −80° C to about −25° C and (ii) the temperature of the mixture does not exceed about +15° C at the end of the crushing or grinding operation.

2. The method of claim 1 in which the polytetrafluoroethylene or the tetrafluoroethylene copolymer is prepared by emulsion polymerization.

3. The method of extruding filled polytetrafluoroethylene or tetrafluoroethylene copolymers prepared by (a) mixing polytetrafluoroethylene or a tetrafluoroethylene copolymer containing at least 50 per cent by weight of tetrafluoroethylene in the copolymer, with a mineral filler, and (b) crushing or grinding the mixture under conditions such that (i) the temperature of the mixture at the beginning of the crushing or grinding is in the range of from about −80° C to about −25° C and (ii) the temperature of the mixture does not exceed about +15° C at the end of the crushing or grinding operation, which comprises mixing the filled polytetrafluoroethylene or tetrafluoroethylene copolymers with a saturated aliphatic or cycloaliphatic hydrocarbon as a lubricant and extruding the lubricated mixture.

* * * * *